United States Patent [19]
Karpenko

[11] 3,905,577
[45] Sept. 16, 1975

[54] VALVE

[75] Inventor: Anatole N. Karpenko, San Francisco, Calif.

[73] Assignee: Anchor/Darling Valve Company, Hayward, Calif.

[22] Filed: July 9, 1973

[21] Appl. No.: 377,425

Related U.S. Application Data

[63] Continuation-in-part of Ser. No. 339,113, March 8, 1973.

[52] U.S. Cl............ 251/357; 29/157.1 R; 251/306; 251/333; 251/334
[51] Int. Cl............................................ F16k 25/00
[58] Field of Search ........... 251/357, 366, 367, 360, 251/304–307, 314–317, 356, 358, 359, 332–334; 137/329.06, 516.27; 29/157.1 R, 157.1 A

[56] References Cited
UNITED STATES PATENTS

| | | |
|---|---|---|
| 556,037 | 3/1896 | Weiss.............................. 251/358 X |
| 978,930 | 12/1910 | O'Malley ............................ 251/357 |
| 1,288,811 | 12/1918 | Birrell................................. 251/356 |
| 1,962,520 | 6/1934 | O'Malley ........................ 251/357 X |
| 2,054,064 | 9/1936 | Anderson............................ 251/306 |
| 2,840,338 | 6/1958 | Shaw.................................. 251/306 |
| 2,985,424 | 5/1961 | Anderson et al. .............. 251/357 X |
| 3,228,651 | 1/1966 | Egashira ........................ 251/298 X |

FOREIGN PATENTS OR APPLICATIONS

| 121,874 | 7/1946 | Australia............................. 251/359 |

Primary Examiner—Charles J. Myhre
Assistant Examiner—Ira S. Lazarus

[57] ABSTRACT

A novel form of valve seat is provided which is extremely useful in any form of valve such as a butterfly valve, a globe valve or an angle type valve. Further, the valve seat of the present invention is particularly useful in any valve in which a fluid is handled under relatively high pressure and/or temperatures.

2 Claims, 4 Drawing Figures

VALVE

BACKGROUND OF THE INVENTION

This is a continuation-in-part of my application Ser. No. 339,113, filed Mar. 8, 1973.

In the past, valve seats have generally been formed on the face of a valve member. If, for any reason, the valve seat became damaged, it was necessary to replace the entire valve member.

SUMMARY OF THE INVENTION

It is in general the broad object of the present invention to provide a novel form of a valve seat construction which can be readily replaced and which is useful in controlling flow of a fluid which is at a high temperature or is at a high pressure.

A further object of the present invention is to provide a novel form of valve seat which is flexible so that it seats quite readily.

The invention includes other objects and features of advantage, some of which, together with the foregoing, will appear hereinafter wherein the present preferred form of valve seat of this invention is disclosed.

DESCRIPTION OF THE PREFERRED EMBODIMENT

Figure 1:
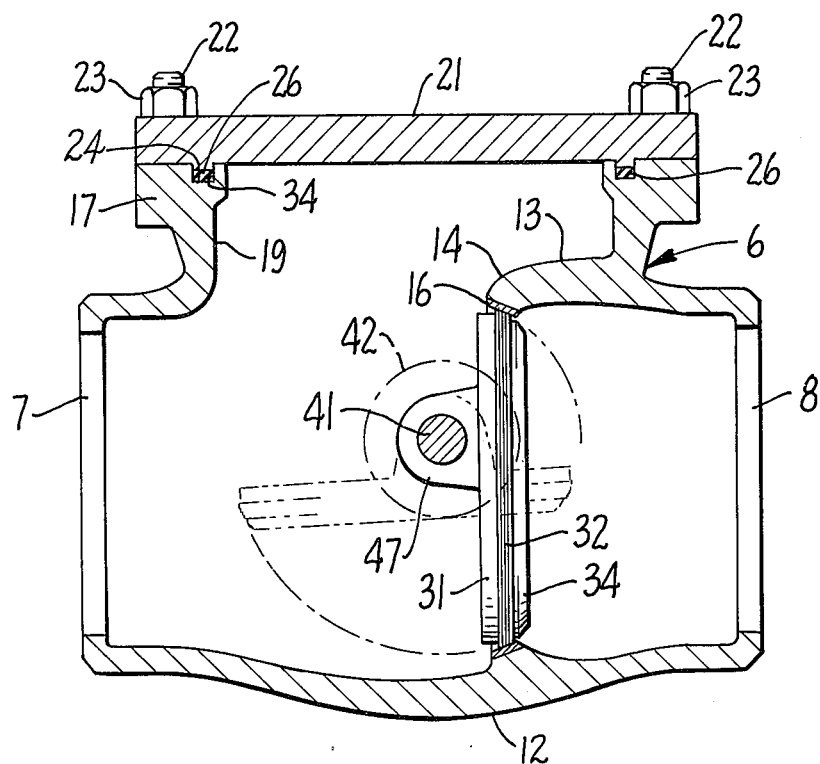
FIG. 1 is a side elevation, partly in section, taken through one form of valve utilizing the valve seat of the present invention.
Figure 2:
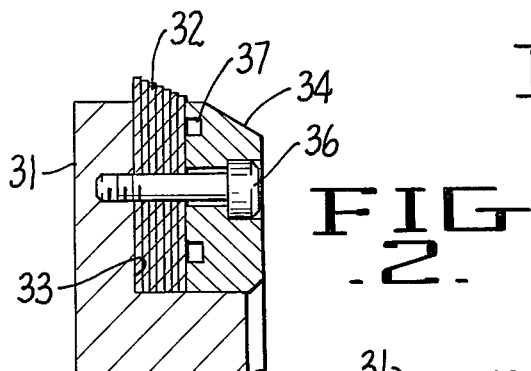
FIG. 2 is an enlarged section taken through the valve member showing the valve seat of this invention.
Figure 3:
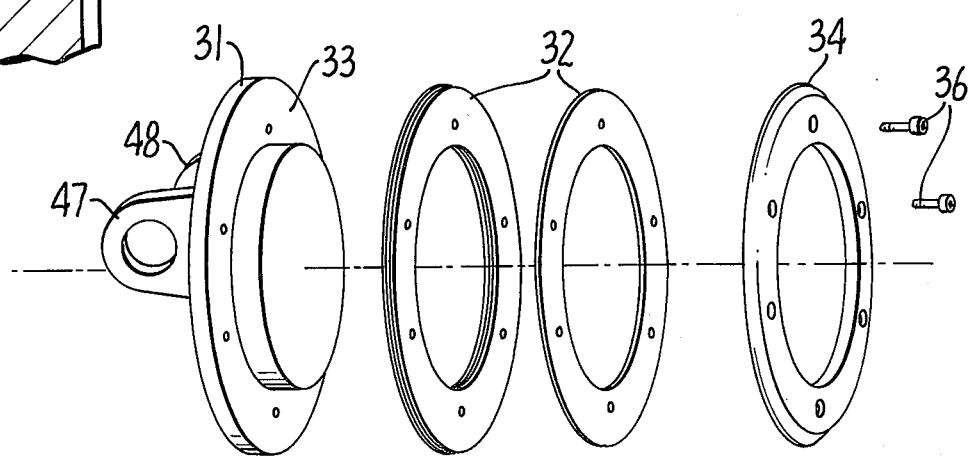
FIG. 3 is an exploded perspective view showing the valve member and some of the elements making up the valve seat.

In the embodiment shown particularly in FIGS. 1, 2 and 3, a valve body 6 is provided with ends 7 and 8 to permit placing of the valve in a pipeline in which the valve body is secured as by welding. Between the ends 7 and 8, the valve body is generally circular in cross section. The lower side 12 of the valve is enlarged somewhat while the upper portion 13 interiorally of the valve extends toward the end 7 and provides the upper portion of the valve seat, generally indicated at 14. The valve seat 14 includes a suitable facing material 16.

The valve body includes an upwardly extending wall 17 defining an annular opening 19 permitting ready access to the interior of the valve body. The annular opening is closed by a circular plate 21 secured in place as by studs 22 and nuts 23. An annular groove 24 is provided to receive a depending annular ring 26 on the underside of the flange 21. This construction enables one to gain access to the interior of the valve to repair or replace any parts.

The valve is provided by a disc 31 having an annular seating member 32 mounted in an annular groove 33 provided on one face of the disc and retained in place by retainer ring 34 and cap screws 36. The disc is supported for rotation in the body 6 by stub shaft 41 extending through bosses 42 on the side wall of the valve body. The stub shaft 41 can be rotated by any suitable means. The disc has hubs 47 and 48 on the opposite sides of the disc, the hubs being positioned a distance above the midpoint of the disc so that the turning of the disc results in an eccentric motion such that, as appears in FIG. 2, the upper part of the disc moves downwardly while the lower part moves upwardly and the paths of travel are not concentric about the center of the disc.

In accordance with this invention, the annular seating member 32 is made up of several annular rings of a suitable metal such as stainless steel. The several rings are each of a different diameter to provide an angular seating face to seat against valve seat 14. These are assembled in a laminated ring form and are held together by rivets 37. The seating member is held in place by cap screws 36 which extend through a retaining ring 34 into the valve member proper.

Figure 4:
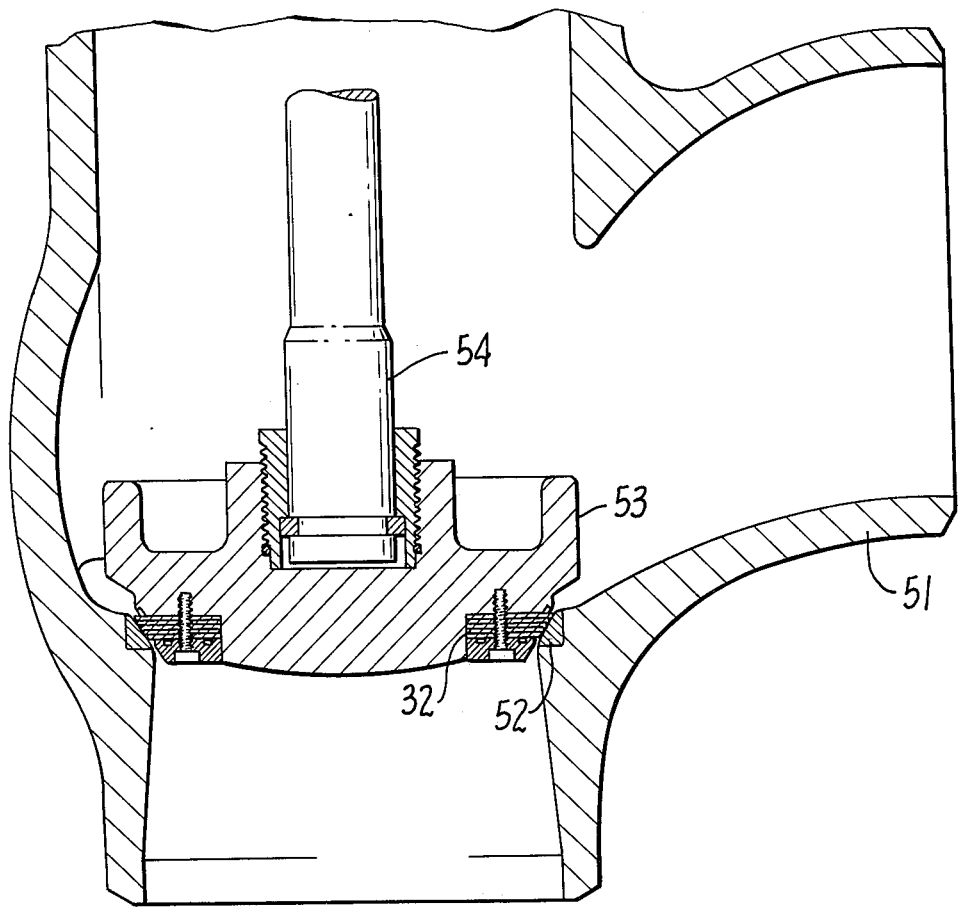
FIG. 4 is a section taken through a valve embodiment such as is used for a globe valve or an angle valve including the valve seat of the present invention.

The utility of the annular seating member 32 made up of several annular rings of a suitable metal such as stainless steel is not confined to the specific valve structure shown but can be used as a seating member on any movable valve element used to control the rate of flow through the valve. Thus in FIG. 4, I have shown a valve such as is used with a globe or angle type of valve. Valve body 51 includes an insert 52 providing a suitable annular valve seat for seating member 32. The valve member 53 in the form of a disc is mounted cooperatively adjacent to the valve seat 52 and is adapted to be raised and lowered as by the valve stem 54 which may be actuated by a hydraulic cylinder and piston construction or by the usual thread and nut to move the valve seating member 32 into and out of engagement with the annular valve seat 52.

I claim:

1. An annular valve member having an annular, peripheral recess therein defining an axially facing shoulder at the periphery of the valve member and a reduced diameter axially projecting boss at the center of the valve member, and a seating member secured in said recess in engagement with said shoulder for cooperation with a valve seat, said seating member comprising a plurality of thin, annular, flat metallic rings all having the same inside diameter and having different outside diameters, the inside diameter of the rings being substantially the same as the inside diameter of the shoulder, said outside diameters of adjacent rings decreasing as the axial distance of the rings from the shoulder increases, the annular peripheries of at least those rings closest the shoulder projecting radially outwardly beyond the periphery of the valve member, a plurality of circumferentially spaced rivets extended axially through said rings fixing the rings in assembled relationship for assembly of the rings as a unit to the valve member, an annular retaining ring having an inner diameter the same as the inner diameter of the rings and an outer diameter substantially the same as the outer diameter of the shoulder and disposed in said recess axially outwardly of said rings and in clamping relationship with said rings, and a plurality of removable fastening means extended through said retaining ring and through aligned openings in said rings into the valve member to removably secure the retaining ring and metallic rings in operative position in said recess.

2. An annular valve member as in claim 1, wherein the annular rings comprise stainless steel, and the removable fastening means comprises a plurality of cap screws extended through the retaining ring and annular rings into the shoulder of the valve member.

* * * * *